United States Patent
Kagohara et al.

(10) Patent No.: US 7,041,387 B2
(45) Date of Patent: *May 9, 2006

(54) MULTI-LAYERED ALUMINUM-BASE BEARING

(75) Inventors: Yukihiko Kagohara, Inuyama (JP); Takeshi Hoshina, Inuyama (JP); Hideo Ishikawa, Inuyama (JP); Masaaki Sakamoto, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 254 days.

This patent is subject to a terminal disclaimer.

(21) Appl. No.: 10/638,494

(22) Filed: Aug. 12, 2003

(65) Prior Publication Data

US 2004/0028939 A1    Feb. 12, 2004

(30) Foreign Application Priority Data

Aug. 12, 2002  (JP) ............................. 2002-234807

(51) Int. Cl.
*B32B 15/20*  (2006.01)
*F16C 33/06*  (2006.01)

(52) U.S. Cl. .................. 428/654; 428/653; 384/912

(58) Field of Classification Search ............. 428/653, 428/654; 384/912; 228/235.2, 235.3; 148/531
See application file for complete search history.

(56) References Cited

U.S. PATENT DOCUMENTS

| 3,268,369 | A | * | 8/1966 | Haugen ....................... 148/531 |
| 5,384,205 | A | | 1/1995 | Tanaka et al. |
| 6,163,961 | A | * | 12/2000 | McMeekin ............. 29/898.056 |
| 6,413,654 | B1 | * | 7/2002 | Kagohara et al. ........... 428/653 |
| 2002/0034454 | A1 | * | 3/2002 | Fujita et al. ................. 420/548 |
| 2002/0068189 | A1 | | 6/2002 | Kagohara et al. |
| 2004/0247932 | A1 | * | 12/2004 | Kagohara et al. ........... 428/650 |

FOREIGN PATENT DOCUMENTS

| DE | 43 32 433 A1 | 5/1994 |
| DE | 101 49 675 A1 | 5/2002 |
| GB | 708472 | 5/1954 |
| GB | 2369162 A | 5/2002 |
| JP | 2002-121631 | 4/2002 |

* cited by examiner

*Primary Examiner*—John J. Zimmerman
(74) *Attorney, Agent, or Firm*—Browdy and Neimark, PLLC

(57) ABSTRACT

Disclosed is a multi-layered Al-base bearing consisting of a steel back layer, an intermediate Al alloy layer and an Al-base bearing alloy layer which contains one or more elements selected from the group of Cu, Zn, Mg and Si, and which is bonded to the steel back layer via the intermediate Al alloy layer. The bearing is subjected to solution treatment at a temperature of not lower than 400° C. The intermediate Al alloy layer has a sub-layer being in direct contact with the steel back layer, and at least one sub-layer positioned closer than the former sub-layer to the Al-base bearing alloy layer. The former sub-layer consists of an Al alloy contains 2 to 8 mass % Si, and has a thickness proportion of 5 to 25% to the entire thickness of the intermediate Al alloy layer.

4 Claims, 1 Drawing Sheet

MULTI-LAYERED ALUMINUM-BASE BEARING

BACKGROUND OF THE INVENTION

The present invention relates to a multi-layered aluminum-base bearing in which an aluminum-base bearing alloy layer is bonded to a steel back layer via an intermediate aluminum alloy layer.

PRIOR ART

Conventionally, aluminum alloy bearings having excellent properties of conformability and wear resistance are broadly used in high power engines of motor vehicles and general industrial machinery. Such an aluminum alloy bearing usually has a three-layered structure in which an aluminum-base bearing alloy layer is bonded to a steel back layer via an intermediate aluminum alloy layer. The intermediate aluminum alloy layer has been made of pure aluminum or an aluminum alloy, which has comparatively low hardness.

However, engines, to which such aluminum alloy bearings are to be applied, are becoming more and more high power, and the aluminum alloy bearings have been required to have improved properties of fatigue resistance and wear resistance. To meet this requirement, there have been proposed some aluminum alloy bearings in which Cu, Zn, Mg or Si is added to an aluminum-base bearing alloy which is subjected to solution treatment in order to improve alloy strength.

However, when the aluminum alloy bearings are subjected to solution treatment, an Al—Fe intermetallic compound is produced at the boundary between the intermediate aluminum alloy layer and the steel back layer. Since the Al—Fe intermetallic compound is brittle, there is a concern that the intermediate aluminum alloy layer may be delaminated from the steel back layer under such an environment of use where varying load is exerted on engine bearings.

In order to avoid this, as shown in JP-A2002-121631, the present inventors tried to make a multi-layered aluminum alloy bearing by adding 2 to 8 mass % of Si in a sub-layer of an intermediate aluminum alloy layer, which sub-layer is in direct contact with a steel back layer. When the intermediate aluminum alloy layer contains Si, Al—Fe—Si system compounds, rather than the Al—Fe compound, preferentially precipitate at the boundary between the intermediate aluminum alloy layer and the steel back layer. The Al—Fe—Si system compounds do not precipitate even at a temperature above 400° C., not until a temperature exceeding 550° C. Therefore, in the aluminum alloy bearing, the brittle Al—Fe intermetallic compound can be effectively prevented from generation. On the other hand, while the higher the solution treatment temperature is, generally the greater the strength of the bearing alloy can become, since the aluminum alloy bearing can be subjected to solution treatment at a high temperature of not lower than 400° C., it can be further improved in strength.

However, in the multi-layered aluminum alloy bearing in which Si is added in the sub-layer being in direct contact with the steel back layer, there has arisen a problem during production depending on a thickness of the sub-layer, especially in the case of a small thickness.

For instance, during roll-bonding the intermediate aluminum alloy layer with the steel back layer, the sub-layer of the intermediate aluminum alloy layer, which is in direct contact with the steel back layer, locally fractures, whereby occurrence of the Al—Fe intermetallic compound can not be well avoided resulting in that it can not be well ensured to bond the intermediate aluminum alloy layer to the steel back layer.

BRIEF SUMMARY OF THE INVENTION

The present invention was achieved under the above background.

An object of the invention is to provide a multi-layered aluminum-base bearing having excellent fatigue resistance, in which the sub-layer of the intermediate aluminum alloy layer, being in direct contact with the steel back layer, is made to have a proper thickness whereby occurrence of the brittle Al—Fe intermetallic compound is restrained.

In light of the object, there is provided a multi-layered aluminum-base bearing comprising:

a steel back layer, an intermediate aluminum alloy layer and an aluminum-base bearing alloy layer which contains one or more elements selected from the group of Cu, Zn, Mg and Si, and which is bonded to the steel back layer via the intermediate aluminum alloy layer, and the multi-layered aluminum-base bearing being subjected to solution treatment at a temperature of not lower than 400° C., wherein the intermediate aluminum alloy layer comprises a sub-layer being in direct contact with the steel back layer, and at least one sub-layer positioned closer than the former sub-layer to the aluminum-base bearing alloy layer, the former sub-layer consisting of an aluminum alloy comprising 2 to 8 mass % Si, and having a thickness proportion of 5 to 25% to the entire thickness of the intermediate aluminum alloy layer.

According to such a bearing structure, it is possible to restrain occurrence of the brittle Al—Fe intermetallic compound at the boundary between the intermediate aluminum alloy layer and the steel back layer by the additive Si whereby making it possible to subject the multi-layered aluminum-base bearing to solution treatment at high temperature resulting in enabling an improvement in strength of the aluminum-base bearing alloy layer. If the Si content is less than 2 mass %, the aforementioned effect cannot be obtained. If the Si content exceeds 8 mass %, plastic workability such as ductility will be significantly deteriorated. The Si content is preferably 6 to 8 mass %.

In the aluminum-base multi-layered bearing of the invention, the thickness of the sub-layer, being in direct contact with the steel back layer, has a thickness proportion of 5 to 25% to the entire thickness of the intermediate aluminum alloy layer. If the thickness proportion is less than 5%, since the thickness of the sub-layer is small, during roll-bonding the intermediate aluminum alloy layer with the steel back layer, the sub-layer being in direct contact with the steel back layer will locally fracture, whereby occurrence of the Al—Fe intermetallic compound can not be well avoided resulting in that it can not be well ensured to bond the intermediate aluminum alloy layer to the steel back layer. On the other hand, if the thickness proportion exceeds 25%, since the sub-layer being in direct contact with the steel back layer is softer than the aluminum-base bearing alloy layer, it can not be durable in use due to occurrence of fatigue under such a severe condition as in a high power engine.

The multi-layered aluminum-base bearing of the invention has excellent fatigue resistance property, since the sub-layer being in direct contact with the steel back layer has a proper thickness proportion to the entire thickness of the intermediate aluminum alloy layer as stated above. Preferably, the thickness proportion 8 to 20%.

According to one embodiment of the multi-layered aluminum-base bearing of the invention, the sub-layer of the intermediate aluminum alloy layer, which is in direct contact with the steel back layer, has a thickness of not less than 2 μm.

With respect to the thickness proportion of the sub-layer of the intermediate aluminum alloy layer, which is in direct contact with the steel back layer, to the entire thickness of the intermediate aluminum alloy layer, in the case where the thickness proportion is 10% and the entire thickness of the intermediate aluminum alloy layer is set to a usual thickness of 20 μm, the above sub-layer can have a thickness of 2 μm, whereby the sub-layer can fully exhibit its essential function. However, if the entire thickness of the intermediate aluminum alloy layer is set to a thickness of about 15 μm, the thickness of the sub-layer will be 1.5 μm. In this case, since the thickness of the sub-layer is too small, a problem may arise that the sub-layer fractures locally during roll-bonding the intermediate aluminum alloy layer with the steel back layer. Thus, it is preferable to form the sub-layer being in direct contact with the steel back layer so as to have a thickness of not less than 2 μm as mentioned above.

In order to strengthen the intermediate aluminum alloy layer, the sub-layer of the intermediate aluminum alloy layer, being in direct contact with the steel back layer, can contain one or more additive elements other than Si, which are raised in at least one group selected from the following groups (1) to (3).

(1) one or more elements selected from the group of Cu, Zn and Mg in a total amount of 0.01 to 7 mass %,
(2) one or more elements selected from the group of Mn, V, Mo, Cr, Co, Fe, Ni and W in a total amount of 0.01 to 3 mass %, and
(3) one or more elements selected from the group of B, Ti and Zr in a total amount of 0.01 to 2 mass %. Reasons why such additive amounts of the elements are preferred will be described below.

(1) Cu, Zn and Mg:

One or more of these are added in a total amount of 0.01 to 7 mass %.

These optional elements can be forcibly dissolved into an Al matrix by solution treatment so that fine intermetallic compounds are precipitated by rapid cooling resulting in improved strength of the Al matrix. If the content of the optional elements is less than 0.01 mass %, the above effect cannot be expected. If the content of the optional elements exceeds 7 mass %, the intermetallic compounds become coarse, resulting in deteriorated plastic workability such as in rolling. The content of the elements is preferably 0.5 to 6 mass % in total.

(2) Mn, V, Mo, Cr, Co, Fe, Ni and W:

One or more of these are added in a total amount of 0.01 to 3 mass %.

These optional elements dissolve into the Al matrix, or crystallize elementally or as intermetallic compounds to improve the alloy strength. If the content of the optional elements is less than 0.01 mass %, the above effect cannot be expected. If the content of the optional elements exceeds 3 mass %, the intermetallic compounds become too coarse, resulting in deteriorated plastic workability such as in rolling. The content of the elements is preferably 0.2 to 2 mass % in total.

(3) B, Ti and Zr:

One or more of these are added in a total amount of 0.01 to 2 mass %.

These optional elements dissolve into the Al matrix to improve fatigue strength of the alloy. If the content of the optional elements is less than 0.01 mass %, the above effect cannot be expected. If the content of the optional elements exceeds 2 mass %, the alloy becomes brittle. The content of the elements is preferably 0.02 to 0.5 mass % in total.

The multi-layered aluminum-base bearing of the invention can be produced by sequentially conducting the following steps of bonding the intermediate aluminum alloy layer to the aluminum-base bearing alloy layer;

bonding the aluminum-base bearing alloy layer to the steel back layer via the intermediate aluminum alloy layer; and subjecting the thus obtained layered material to solution treatment by heating it to a temperature of not lower than 400° C. to strengthen the aluminum-base bearing alloy layer. After the solution treatment, the thus produced bearing material may be optionally subjected to artificial aging treatment.

BRIEF DESCRIPTION OF EMBODIMENTS OF THE INVENTION

Figure 1:
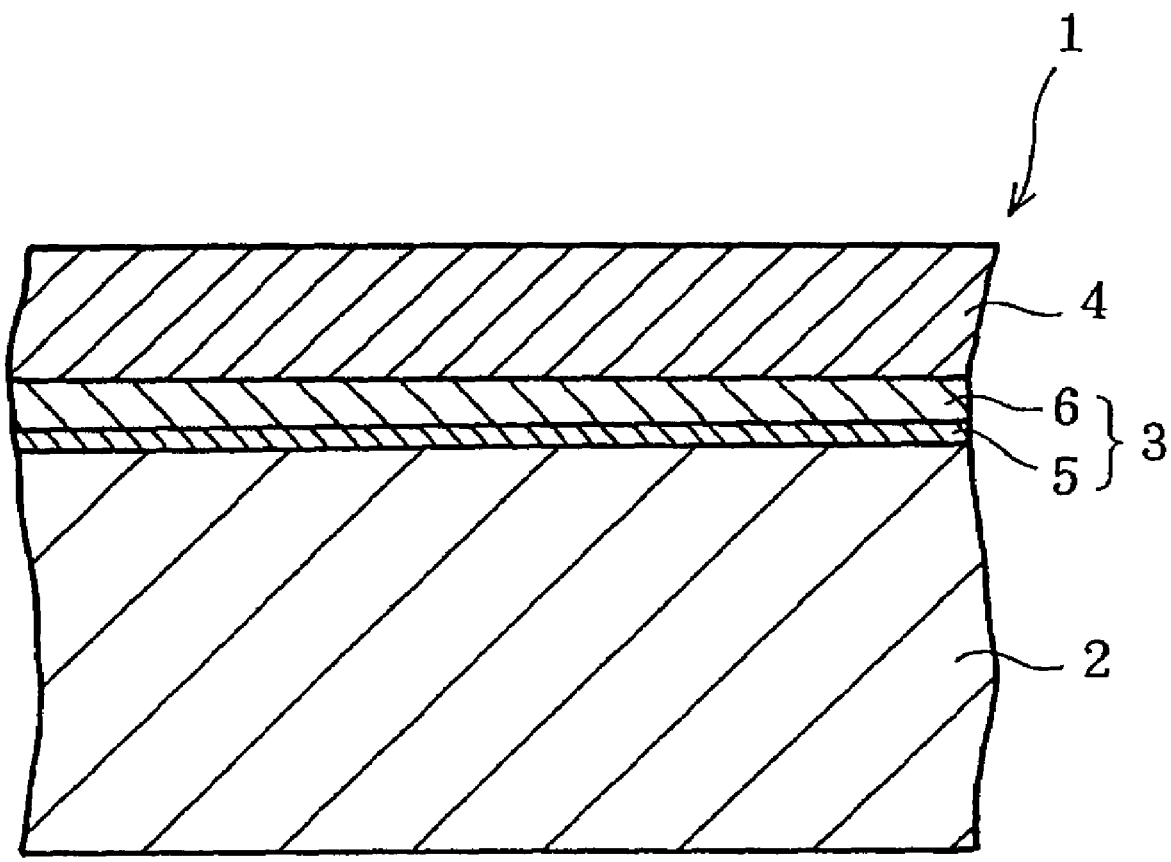
FIG. 1 is a sectional view of a multi-layered aluminum-base bearing as one embodiment of the invention.

Herein below, referring to FIG. 1, a description will be provided with regard to one embodiment of the invention multi-layered aluminum-base bearing.

FIG. 1 shows a section of a multi-layered aluminum-base bearing 1. As shown in the drawing, the multi-layered aluminum-base bearing 1 is produced by bonding an aluminum-base bearing alloy layer 4 to a steel back layer 2 via an intermediate aluminum alloy layer 3. The intermediate aluminum alloy layer 3 has a double-layered structure and consists of a sub-layer 5 (herein below referred to as "an under layer") being in direct contact with the steel back layer 2, and another sub-layer 6 (herein below referred to as "an upper layer") being in direct contact with the aluminum-base bearing alloy layer 4.

The aluminum-base bearing alloy layer of the embodiment comprises one or more elements raised in at least one group selected from the following groups (1) to (5) of:

(1) 3 to 20 mass % of Sn,
(2) one or more elements selected from the group of Cu, Zn, Mg and Si in a total amount of 0.1 to 7 mass %,
(3) one or more elements selected from the group of Mn, V, Mo, Cr, Co, Fe, Ni and W in a total amount of 0.01 to 3 mass %,
(4) one or more elements selected from the group of B, Ti and Zr in a total amount of 0.01 to 2 mass %, and
(5) one or more elements selected from the group of Pb, Bi and In in a total amount of not more than 3 mass %.

Here, there will be provided a description why the above compositions of Items (1) to (5) are preferred.

(1) Sn: 3 to 20 mass %

Sn improves anti-seizure property, conformability and embeddability of the surface properties of the bearing. If the Sn content is less than 3 mass %, no such effect can be obtained. If the Sn content exceeds 20 mass %, the bearing alloy is deteriorated in mechanical properties resulting in that it is not durable in use under severe operational conditions such as those of a high power engine. The Sn content is preferably 6 to 15 mass %.

(2) Cu, Zn, Mg and Si:

One or more of these are added in a total amount of 0.1 to 7 mass %.

These optional elements can be forcibly dissolved into an Al matrix by solution treatment so that fine intermetallic compounds are precipitated by rapid cooling resulting in improved strength of the Al matrix.

While Si dissolves in the Al matrix, and in the case where it crystallizes elementally, it disperses finely, whereby the alloy is improved in fatigue strength property, anti-seizure property and wear resistance property.

If the content of these additives is less than 0.1 mass %, such effects are not expectable. If the content of these additives exceeds 7 mass %, they produce coarse intermetallic compounds resulting in deteriorated fatigue strength of the alloy. The content of the elements is preferably 0.5 to 6 mass % in total.

(3) Mn, V, Mo, Cr, Co, Fe, Ni and W:

One or more of these are added in a total amount of 0.01 to 3 mass %.

These optional elements dissolve into the Al matrix, or crystallize elementally or as intermetallic compounds to improve the alloy strength. If the content of the optional elements is less than 0.01 mass %, the above effect is not expectable. If the content of the optional elements exceeds 3 mass %, the intermetallic compounds become too coarse, resulting in deteriorated plastic workability such as in rolling. The content of the additives is preferably 0.2 to 2 mass % in total.

(4) B, Ti and Zr:

One or more of these are added in a total amount of 0.01 to 2 mass %.

These optional elements dissolve into the Al matrix to improve fatigue strength of the alloy. If the content of the elements is less than 0.01 mass %, the above effect is not expectable. If the content of the elements exceeds 2 mass %, the alloy becomes brittle. The content of the elements is preferably 0.02 to 0.5 mass % in total.

(5) Pb, Bi and In:

One or more of these are added in a total amount of not more than 3 mass %.

These additives improve machinability and anti-seizure property. If the content of the elements exceeds 3 mass %, it will become difficult to cause them to uniformly disperse in the Al matrix, and the alloy strength is deteriorated.

Next, a description will be provided with regard to a producing method for a multi-layered aluminum-base bearing 1 shown in FIG. 1.

First, an aluminum-base bearing alloy sheet is produced by conventional casting and rolling processes, which is to be formed to an aluminum-base bearing alloy layer 4. Also, an aluminum alloy sheet for a lower layer 5 of an intermediate aluminum alloy layer 3 and an aluminum alloy sheet for an upper layer 6 are produced by conventional casting and rolling processes, both of which are bonded with each other by roll-bonding to produce an aluminum alloy sheet for the intermediate aluminum alloy layer. Thereafter, the aluminum-base bearing alloy sheet and the aluminum alloy sheet for the intermediate aluminum alloy layer are bonded by roll-bonding to produce a multi-layered aluminum alloy sheet.

Finally, the multi-layered aluminum alloy sheet is superimposed on a low carbon steel strip for a steel back layer 2, and subsequently they are bonded by roll-bonding to obtain a bimetal in which the aluminum-base bearing alloy sheet is bonded to the steel back layer 2 via the aluminum alloy sheet for the intermediate layer.

Herein after, the aluminum-base bearing alloy sheet will be referred to as the aluminum-base bearing alloy layer 4, the aluminum alloy sheet for the intermediate layer as the intermediate aluminum alloy layer 3, and the low carbon steel strip as the steel back layer 2.

The thus fabricated bimetal is annealed at about 350° C. for three hours, followed by solution treatment at 460 to 520° C. for 10 to 30 minutes. By the solution treatment, Cu, Zn, Mg, Si and so on in the aluminum-base bearing alloy layer 4 are dissolved in an Al matrix. Even if the solution treatment is conducted at a high temperature, because of the presence of Si contained in the lower layer 5, Al—Fe intermetallic compounds are not produced at the boundary between the intermediate aluminum alloy layer 3 and the steel back layer 2.

After solution treatment, the bimetal is rapidly cooled. This contributes to increasing the strength of the aluminum-base bearing alloy layer 4. After that, the bimetal is machined into a semi-cylindrical or cylindrical shape to be produced as a bearing. Incidentally, after the rapid cooling, the bimetal may be subjected to artificial aging treatment (e.g. at 150 to 200° C. for 20 hours).

Thus by this embodiment, the generation of a brittle Al—Fe intermetallic compound at the boundary between the intermediate aluminum alloy layer 3 and the steel back layer 2 by the solution treatment can be prevented. As a result, there is no fear of delamination of the intermediate aluminum alloy layer 3 from the steel back layer 2, and the strength of the aluminum-base bearing alloy layer 4 can be improved to enable the bearing to endure in use for a high power engine.

An experiment was conducted to verify the effects of the invention. The verification experiment included a test to check the presence or absence of the generation of any brittle Al—Fe intermetallic compound on the boundary between the intermediate aluminum alloy layer 3 and the steel back layer 2 after the solution treatment at 460° C., and a fatigue test to measure the fatigue surface pressure as a plain bearing. The test specimens were invention specimens 1 to 5 and comparative specimens 1 to 5, in each of which the aluminum-base bearing alloy layer 4 was bonded to the steel back layer 2 via the intermediate aluminum alloy layer 3 by roll-bonding, the layer 3 having a lower layer 5 as shown in Table 1. The aluminum-base bearing alloy layer 4 used in the preparation of the specimens contained 13 mass % of Sn, 3 mass % of Si, 1.5 mass % of Cu and 0.3 mass % of Mn, and the balance of Al. The upper layer 6 contained 1.0 mass % of Mn, 0.5 mass % of Cu, and the balance of Al. The results of the experiments so carried out are shown in Table 1. The requirements of the fatigue test are shown in Table 2.

TABLE 1

| | Specimen No. | Lower layer Thickness proportion to Total thickness (%) | Layer Thickness of Layer (μm) | Components (mass %) Si | Cu | V | Solution treatment at 460° C. Intermetallic compounds none: o present: x | Fatigue test Maximum surface pressure without fatigue (MPa) |
|---|---|---|---|---|---|---|---|---|
| Invention specimen | 1 | 15 | 2.5 | 6 | 0.5 | — | o | 130 |
| | 2 | 5.2 | 3.5 | 5 | — | — | o | 130 |
| | 3 | 24.5 | 5 | 3 | 0.2 | 0.3 | o | 135 |
| | 4 | 10 | 3.2 | 7 | — | 0.2 | o | 135 |
| | 5 | 21 | 7.5 | 7.5 | — | — | o | 135 |
| Comparative specimen | 1 | 4.2 | 2.1 | 6 | 0.5 | — | x | 110 |
| | 2 | 3.5 | 1.6 | 5 | — | — | x | 105 |
| | 3 | 35 | 20 | 3 | 0.2 | 0.3 | o | 120 |
| | 4 | 27 | 18 | 7 | — | 0.2 | o | 120 |
| | 5 | 50 | 15 | 7.5 | — | — | o | 120 |

TABLE 2

| | Requirement |
|---|---|
| Tester | Fatigue tester |
| Circumferential speed | 9.0 m/s |
| Test duration | 20 hours |
| Lubricating oil | VG68 |
| Oil feed temperature | 100° C. |
| Oil feed pressure | 0.49 MPa |
| Shaft material | JIS S55C |
| Method of evaluation | Maximum surface pressure without fatigue |

To consider the results of tests, in the invention specimens 1 to 5 in which the thickness proportion of the lower layer 5 was from 5 to 25% and its thickness was 2 μm or more, an Al—Fe intermetallic compound was not generated by solution treatment even at a high temperature of 460° C., and the specimens were excellent in fatigue resistance.

In contrast, since the lower layers 5 of the comparative specimens 1 and 2 has a low thickness proportion of 4.2% and 3.5%, respectively, Al—Fe intermetallic compounds were generated by the solution treatment. In the comparative specimens 3 to 5, because of their greater thicknesses of the lower layer 5, no Al—Fe intermetallic compound was generated by solution treatment even at a high temperature, but they were found inferior in fatigue resistance because of their high thickness proportion exceeding 25% of the lower layer 5.

It should be noted that the present invention is not limited to its embodiment described above and illustrated in the drawing, but can be modified or extended as described below.

The intermediate aluminum alloy layer 3 are not limited to a double-layered structure, but may be three or more layers. In the case of a triple-layered structure of the intermediate aluminum alloy layer 3, for example, it is possible make a sub-layer being in direct contact with the aluminum-base bearing alloy layer 4 (hereinafter referred to as a layer A), another sub-layer being in direct contact with the steel back layer 2 (hereinafter referred to as a layer B), and an intermediate sub-layer (hereinafter referred to as a layer C) to have chemical compositions of (a) 4 mass % of Zn, 1 mass % of Cu and the balance of Al, (b) 6 mass % of Si, 0.5 mass % of Cu and the balance of Al, and (c) 1 mass % of Mn, 0.5 mass % of Cu and the balance of Al, respectively. The layers A and B may have the same chemical composition.

Further, the thickness proportions of the individual sub-layers to the total thickness of the intermediate aluminum alloy layer 3 may be, for example, 45% for the layer A, 15% for the layer B and 40% for the layer C, respectively. Also in the case of a bearing structure of more than three layers, it is possible to make the bearing taking the above results into consideration so as to fit a specific use of bearing.

What is claimed is:

1. A multi-layered aluminum-base bearing comprising a steel back layer, an intermediate aluminum alloy layer and an aluminum-base bearing alloy layer which contains one or more elements selected from the group of Cu, Zn, Mg and Si, and which is bonded to the steel back layer via the intermediate aluminum alloy layer, and the multi-layered aluminum-base bearing being subjected to solution treatment at a temperature of not lower than 400° C., wherein
   the intermediate aluminum alloy layer comprises a sub-layer being in direct contact with the steel back layer, and at least one sub-layer positioned closer than the former sub-layer to the aluminum-base bearing alloy layer,
   the former sub-layer consisting of an aluminum alloy comprising 2 to 8 mass % Si, and having a thickness proportion of 5 to 25% to the entire thickness of the intermediate aluminum alloy layer.

2. A multi-layered aluminum-base bearing according to claim 1, wherein, in the sub-layers constituting the intermediate aluminum alloy layer, the sub-layer, being in direct contact with the steel back layer, has a thickness of not less than 2 μm.

3. A multi-layered aluminum-base bearing according to claim 1, wherein
   the sub-layer, being in direct contact with the steel back layer, comprises one or more elements raised in at least one group selected from the following groups (1) to (3) of:
   (1) one or more elements selected from the group of Cu, Zn and Mg in a total amount of 0.01 to 7 mass %,
   (2) one or more elements selected from the group of Mn, V, Mo, Cr, Co, Fe, Ni and W in a total amount of 0.01 to 3 mass %, and
   (3) one or more elements selected from the group of B, Ti and Zr in a total amount of 0.01 to 2 mass %.

4. A multi-layered aluminum-base bearing according to claim 2, wherein
the sub-layer, being in direct contact with the steel back layer, comprises one or more elements raised in at least one group selected from the following groups (1) to (3) of:
(1) one or more elements selected from the group of Cu, Zn and Mg in a total amount of 0.01 to 7 mass %,
(2) one or more elements selected from the group of Mn, V, Mo, Cr, Co, Fe, Ni and W in a total amount of 0.01 to 3 mass %, and
(3) one or more elements selected from the group of B, Ti and Zr in a total amount of 0.01 to 2 mass %.

* * * * *